(12) United States Patent
Berrell

(10) Patent No.: US 12,103,333 B2
(45) Date of Patent: Oct. 1, 2024

(54) AXLE ASSEMBLY HAVING AN ADJUSTABLE LENGTH

(71) Applicant: Hexlox UG, Berlin (DE)

(72) Inventor: Ian Berrell, New South Wales (AU)

(73) Assignee: Hexlox UG, Berlin (DE)

( * ) Notice: Subject to any disclaimer, the term of this patent is extended or adjusted under 35 U.S.C. 154(b) by 878 days.

(21) Appl. No.: 16/972,087

(22) PCT Filed: Jun. 3, 2019

(86) PCT No.: PCT/EP2019/064309
§ 371 (c)(1),
(2) Date: Dec. 4, 2020

(87) PCT Pub. No.: WO2019/233933
PCT Pub. Date: Dec. 12, 2019

(65) Prior Publication Data
US 2021/0122189 A1    Apr. 29, 2021

(30) Foreign Application Priority Data

Jun. 4, 2018   (EP) ..................................... 18175792

(51) Int. Cl.
*B60B 35/10*    (2006.01)
*B62K 25/02*    (2006.01)

(52) U.S. Cl.
CPC ............ *B60B 35/109* (2013.01); *B62K 25/02* (2013.01)

(58) Field of Classification Search
CPC ..... B60B 35/109; B60B 27/02; B60B 27/023; B62K 25/02
See application file for complete search history.

(56) References Cited

U.S. PATENT DOCUMENTS 5,531,510 A * 7/1996 Yamane ................ B60B 27/023
301/124.2
5,676,228 A * 10/1997 Lin ....................... B60B 27/023
192/64

(Continued)

FOREIGN PATENT DOCUMENTS

CA    2393590 A1    1/2004
CH    283296 A      5/1952

(Continued)

OTHER PUBLICATIONS

European Patent Office, International Search Report and Written Opinion in application No. PCT/EP2019/064309, dated Aug. 20, 2019, 13 pages, Rijswijk, Netherlands.

*Primary Examiner* — Jason R Bellinger
(74) *Attorney, Agent, or Firm* — Marshall & Melhorn, LLC

(57) ABSTRACT

An axle assembly may have a first axle member, including a recess with a female threaded portion, and a second axle member with an insertion portion and a protrusion portion. The insertion portion may be received in the recess and it may have a male threaded portion engaged with the female threaded portion of the first axle member. The protrusion portion protrudes out of the recess. An overall length of the axle assembly is adjustable by moving the threads of the male threaded portion of the second axle member along the threads of the female threaded portion of the first axle member, or vice versa. An axle and hub arrangement with the axle assembly is also disclosed.

16 Claims, 10 Drawing Sheets

(56) References Cited

U.S. PATENT DOCUMENTS

Figure 1C:
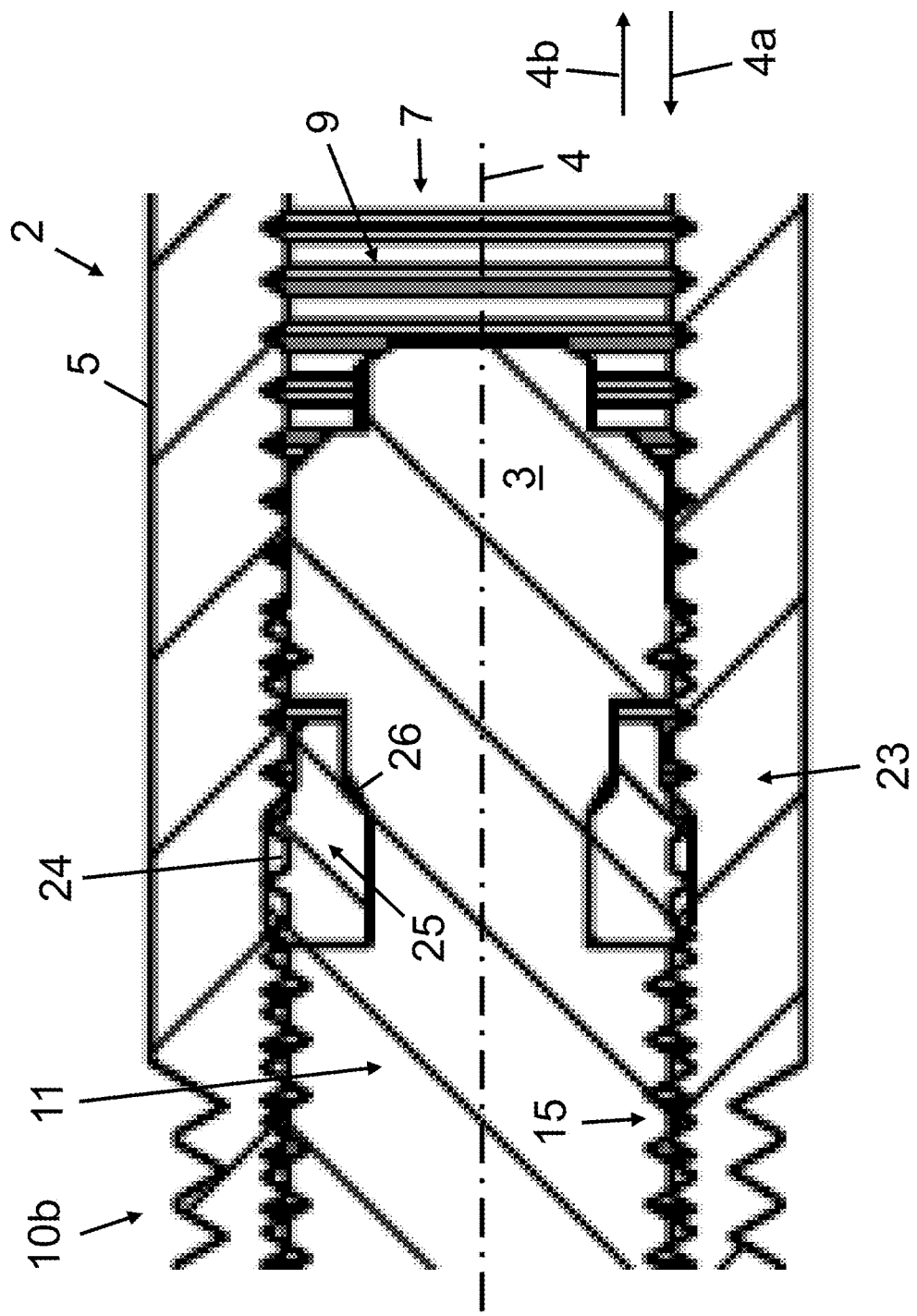

| | | | |
|---|---|---|---|
| 9,376,160 B2 * | 6/2016 | Pye | B60B 27/023 |
| 2002/0145331 A1 * | 10/2002 | Wu | B60B 27/0005 |
| | | | 301/110.5 |
| 2020/0070573 A1 * | 3/2020 | Hsieh | B60B 35/04 |
| 2022/0355891 A1 * | 11/2022 | Schlanger | B60B 27/023 |
| 2022/0388595 A1 * | 12/2022 | Tung | B62J 11/22 |

FOREIGN PATENT DOCUMENTS

| | | |
|---|---|---|
| DE | 202009008246 U1 | 10/2009 |
| DE | 202013100882 U1 | 3/2013 |
| EP | 0890505 A1 | 1/1999 |
| FR | 2771677 A1 | 6/1999 |

* cited by examiner

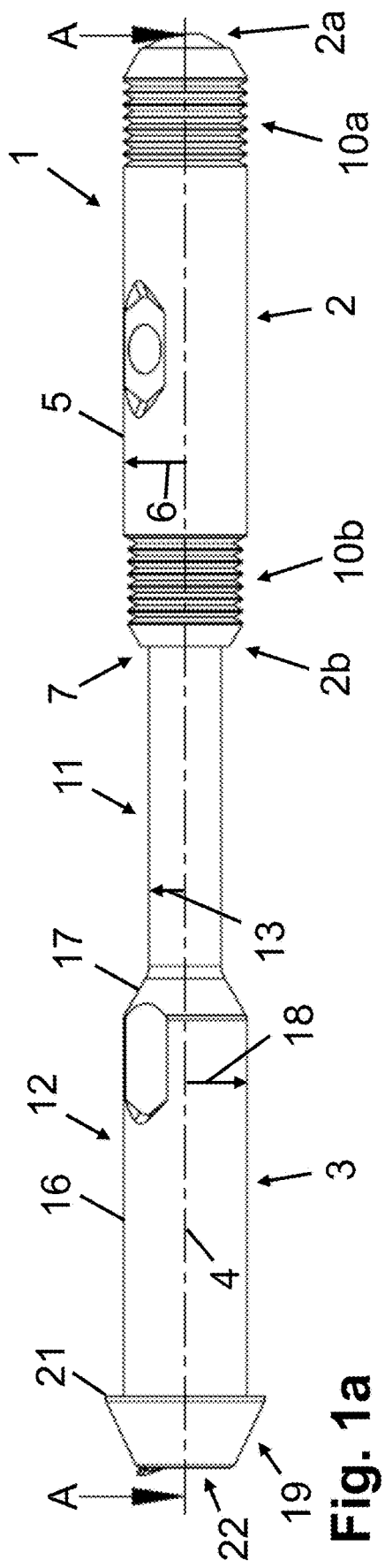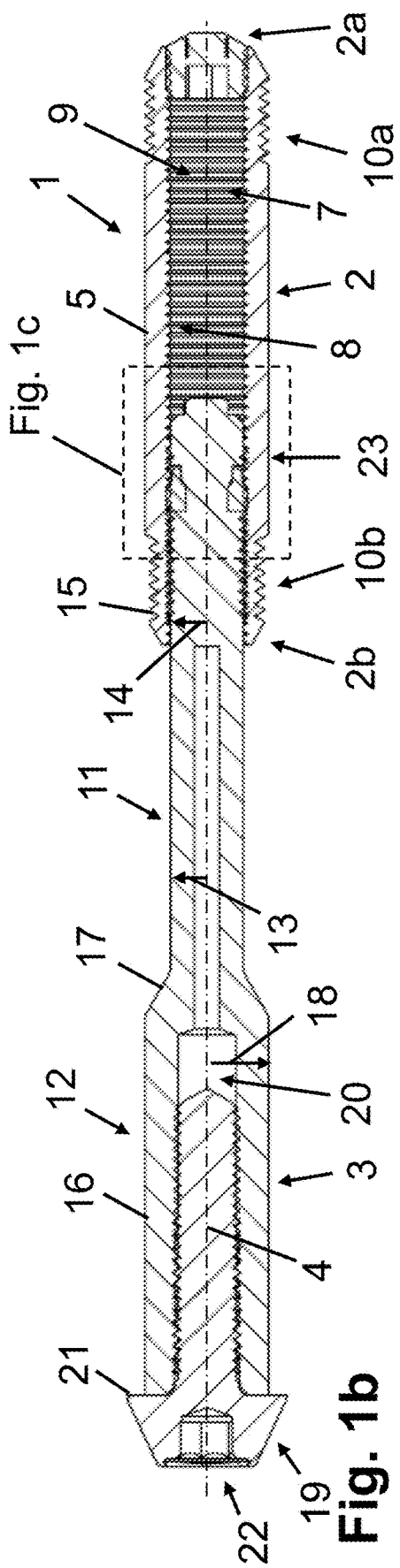

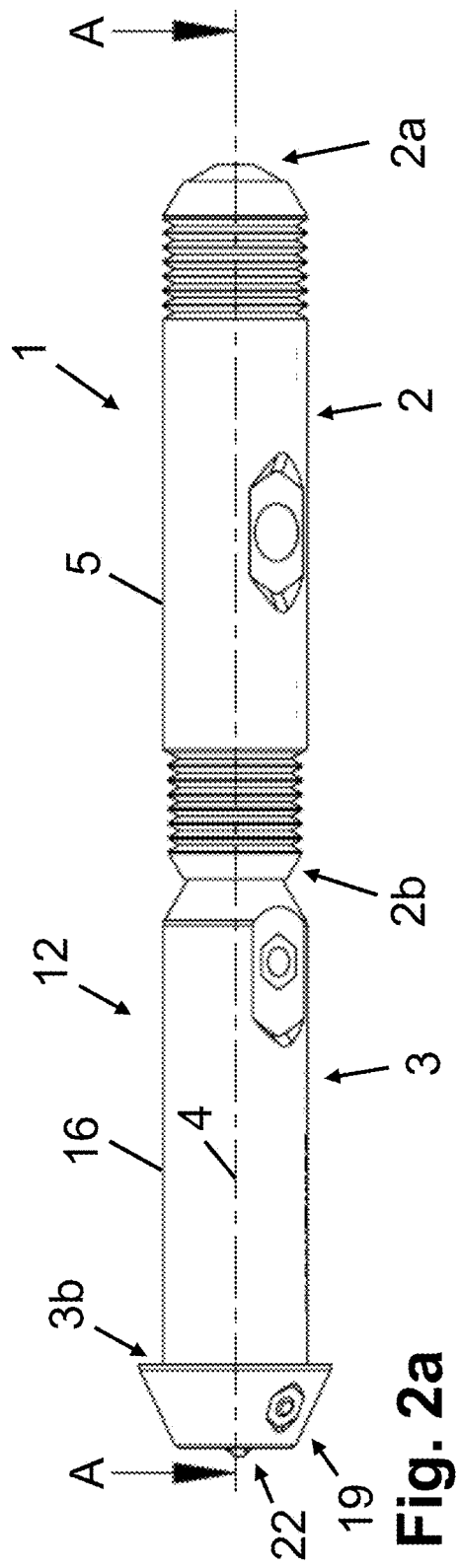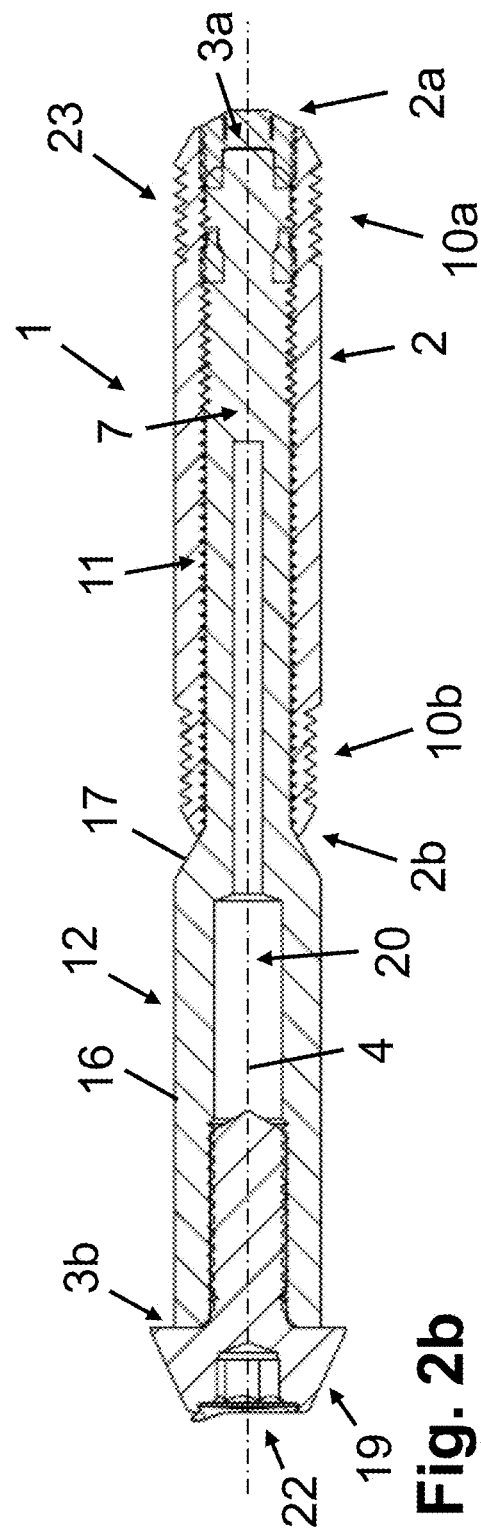

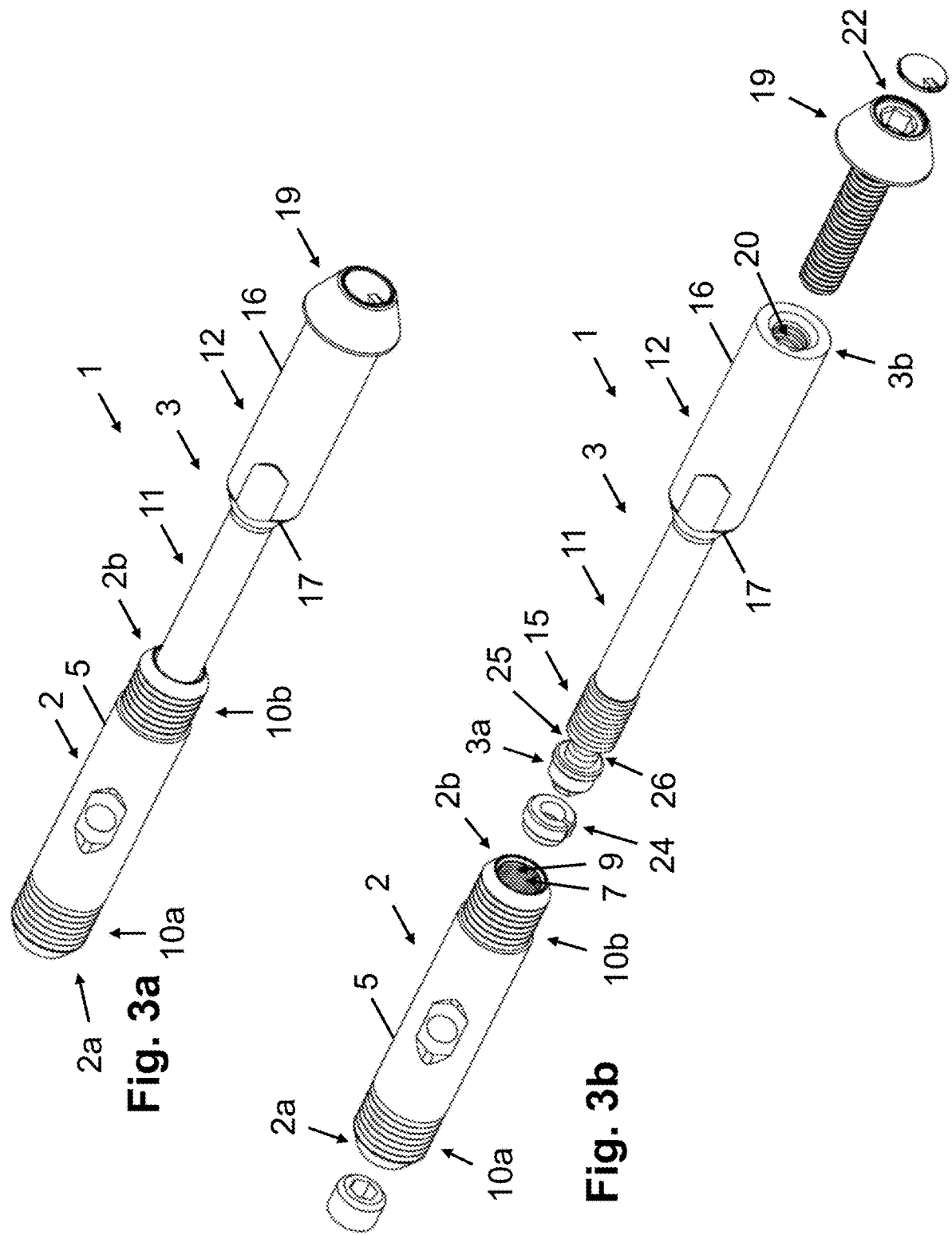

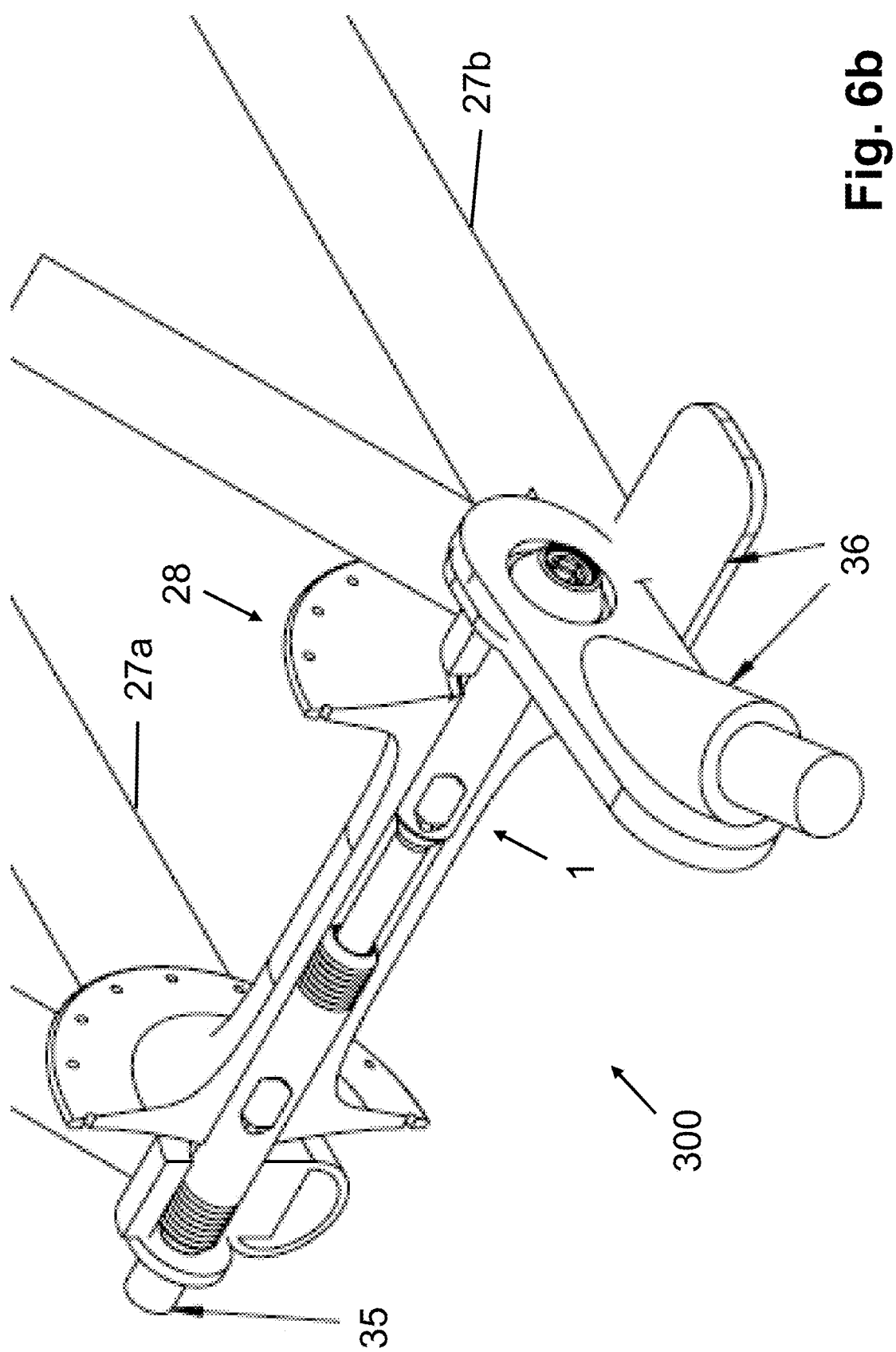

AXLE ASSEMBLY HAVING AN ADJUSTABLE LENGTH

The present disclosure primarily relates to an axle assembly, in particular for supporting a bicycle hub. The present disclosure further relates to an axle and hub arrangement for a bicycle comprising said axle assembly.

Thru axles for bicycle wheels are widely used for different types of bicycles. Typically, a thru axle has a threaded portion at one of its ends that may be engaged with a mating threaded portion on a bicycle fork or dropout on which the bicycle wheel is intended to be mounted, thereby providing a structural connection across the fork or dropout and a sufficient degree of stiffness, rigidity and responsive steering.

However, to date no industry standard is in place and manufacturers develop bicycle forks, dropouts and axles of different types and geometries. For example, known bicycle axles come with different diameters, lengths and thread types. Often, this makes the task of finding an axle that fits a given bicycle fork or dropout difficult. Also, suppliers need to hold large stocks of spare parts.

Thus, there is need for an axle assembly and for an axle and hub arrangement suitable to be used with a preferably large variety of forks or dropouts.

This problem is solved by an axle assembly according to the claims and by an axle and hub arrangement comprising said axle assembly. Special embodiments are described in the dependent claims.

Thus, an axle assembly or thru axle assembly is presently proposed, in particular for supporting a bicycle hub, the axle assembly having an adjustable length and comprising:
- a first axle member comprising a recess which is open at least at one end of the first axle member, and further comprising a female threaded portion formed on an inner surface of the first axle member enclosing the recess; and
- a second axle member comprising an insertion portion and a protrusion portion;
- wherein the insertion portion of the second axle member is at least partially received or configured to be at least partially received in the recess of the first axle member and has a male threaded portion formed on an outer surface of the insertion portion, the male threaded portion of the second axle member configured to be engaged with the female threaded portion of the first axle member to form a threaded connection between the first axle member and the second axle member; and
- wherein the first axle member and the second axle member are configured such that when the insertion portion of the second axle member is received or at least partially received in the recess of the first axle member and the male threaded portion of the second axle member is engaged with the female threaded portion of the first axle member, the protrusion portion of the second axle member protrudes out of the recess of the first axle member and an overall length of the axle assembly is adjustable, that is the length may be increased and/or decreased, by moving the threads of the male threaded portion of the second axle member along the threads of the female threaded portion of the first axle member, or vice versa.

As the overall length of the axle assembly is adjustable by moving the threads of the male threaded portion of the second axle member along the threads of the female threaded portion of the first axle member, or vice versa, the proposed axle assembly may be used for a variety of forks or dropouts having different geometries.

Typically, the first axle member and the second axle member are elongate members comprising or made of metal, such as titanium or steel, metal alloys or carbon. The insertion portion and the protrusion portion forming the second axle member are usually formed in one piece.

The first axle member may comprise a first support portion and the protrusion portion of the second axle member may comprise a second support portion. When the male threaded portion of the second axle member is engaged with the female threaded portion of the first axle member forming the threaded connection between the first axle member and the second axle member, the first axle member and the second axle member define an axis of rotation for a wheel or wheel hub, in particular for a bicycle hub, which may be mounted on the axle assembly. When the first axle member and the second axle member are engaged with one another, the first support portion of the first axle member and the second support portion of the second axle member may be configured to support a wheel hub or a wheel hub support member, in particular a wheel hub or wheel hub support member having a cylindrical inner surface, on an outer surface or on an outer contour of the first support portion and on an outer surface or on an outer contour of the second support portion, in particular in such a way that when a wheel or wheel hub is mounted on the outer contour of the first support portion and of the second support portion, an axis of rotation of the wheel or wheel hub coincides with the axis of rotation defined by the first axle member and the second axle member.

Typically, the first support portion and the second support portion are configured such that when the first axle member and the second axle member are engaged with one another through the threaded connection, a radius or a maximum radial extension of the first support portion perpendicular to the axis of rotation defined by the first axle member and the second axle member is equal to a radius or to a maximum radial extension of the second support portion perpendicular to the axis of rotation.

Supporting the wheel or wheel hub on the outer contour of both first support portion of the first axle member and the second support portion of the second axle member may give rise to a more even distribution of the load resting on the axle assembly between the different arms of the bicycle fork or dropout, for example.

Preferably, both the first support portion and the second support portion have a cylindrical outer contour, wherein the cylinder axis coincides with the axis of rotation defined by the first axle member and the second axle member, and wherein the cylindrical outer contour of the first support portion and the cylindrical outer contour of the second support portion have the same radius. In this case, the cylindrical outer contour of the first support portion and the cylindrical outer contour of the second support portion are configured to support a wheel hub or a wheel hub support member having a cylindrical inner surface which is complementary or essentially complementary to the cylindrical outer contour of the first support portion and to the cylindrical outer contour of the second support portion, in particular in such a way that an axis of rotation of the wheel or wheel hub to be mounted on the axle assembly coincides with the axis of rotation defined by the first axle member and the second axle member.

However, it is understood that the outer contour of the first support portion and of the second support portion may be non-cylindrical. Also, the outer contour of the first support portion may possibly be different from the outer contour of the second support portion. For example, the outer contour of the first support portion and/or of the second support portion may be configured such that a section of the first support portion and/or of the second support portion in a plane perpendicular to the axis of rotation defined by the first axle member and the second axle member has a polygonal shape, preferably a symmetric polygonal shape. Preferably, the points of this polygonal shape having a maximum distance from the axis of rotation defined by the first axle member and the second axle member lie on or contact the surface of a virtual cylinder whose cylinder axis coincides with the axis of rotation defined by the first axle member and the second axle member. Preferably, the first support portion and the second support portion are configured such that for each section of the first support portion and/or of the second support portion in a plane perpendicular to the axis of rotation defined by the first axle member and the second axle member, the polygonal cross section contacts the surface of the above-mentioned virtual cylinder at least at three different positions or points. Also in this case, the outer contours of the first support portion and of the second support portion are configured to support a wheel hub or a wheel hub support member having a cylindrical inner surface, in particular in such a way that an axis of rotation of the wheel or wheel hub to be mounted on the axle assembly coincides with the axis of rotation defined by the first axle member and the second axle member.

The axle assembly may further comprise a torque limiting mechanism configured to selectively rotationally lock the first axle member and the second axle member to one another. The torque limiting mechanism may be configured to limit a torque transmitted between the first axle member and the second axle member when or only when the male threaded portion of the second axle member is engaged with the female threaded portion of the first axle member. Typically, the torque limiting mechanism is configured such that it allows a rotation of the first axle member and the second axle member relative to one another only if a difference in torque acting on the first axle member and the second axle member exceeds a threshold, for example a predefined threshold.

For example, when the first axle member and the second axle member are engaged with one another via the threaded connection, the torque limiting mechanism may allow inserting the entire axle assembly into a thread of a bicycle fork or dropout as if it were a one-piece axle, without the first axle member and the second axle member rotating relative to one another. This may significantly facilitate the installation of the axle assembly. When, say, the first axle member has been firmly connected to one arm of the fork or dropout, the user installing the axle assembly may then further rotate the second axle member relative to the first axle member in order to increase or decrease the overall length of the axle assembly, which may be necessary to adjust the length of the axle assembly to the distance between the arms of the fork.

The torque limiting mechanism may comprise one or more friction enhancing members mounted on at least one of the first axle member and the second axle member. The friction enhancing member may then be configured to selectively rotationally lock the first axle member and the second axle member to one another by selectively frictionally locking the first axle member and the second axle member to one another. In this case, the threshold value or minimum value of the relative torque that must be applied between the first axle member and the second axle member in order to rotate the first axle member relative to the second axle member is typically determined by the static friction between the first axle member and the second axle member provided by the one or more friction enhancing members.

The friction enhancing member may be mounted on or attached to one of the first axle member and the second axle member and may be configured to frictionally interfere with the female or male threaded portion of the other of the first axle member and the second axle member. In other words, the friction enhancing member may be mounted on or attached to the first axle member and may be configured to frictionally interfere with the male threaded portion formed on the outer surface of the insertion portion of the second axle member, for example when or only when the male threaded portion of the second axle member is engaged with the female threaded portion of the first axle member. Or the friction enhancing member may be mounted on or attached to the second axle member and may be configured to frictionally interfere with the female threaded portion formed on the inner surface of the recess of the first axle member, for example when or only when the male threaded portion of the second axle member is engaged with the female threaded portion of the first axle member.

An indentation for receiving the friction enhancing member may be formed in or on the inner surface of the first axle member enclosing the recess of the first axle member, and/or in or on the outer surface of the insertion portion of the second axle member. In other words, the friction enhancing member may be received in or may be configured to be received in the indentation. For example, the indentation may be formed as an annular indentation. However, it is understood that the indentation may have other forms or shapes. In particular, the indentation may not extend over the entire circumference of the first axle member or of the second axle member.

The indentation for receiving the friction enhancing member may comprise a taper along the axial direction or axis of rotation defined by the first axle member and the second axle member when the first axle member and the second axle member are engaged with one another via the female threaded portion of the first axle member and the male threaded portion of the second axle member. For example, if the indentation is formed in or on the inner surface of the recess of the first axle member, the taper may include a continuous increase or decrease of an inner diameter of the first axle member along the axial direction. And if the indentation is formed in or on the outer surface of the insertion portion of the second axle member, the taper may include a continuous increase or decrease of an outer diameter of the insertion portion of the second axle member along the axial direction. The taper or both the taper and the friction enhancing member may then be configured such that when the threads of male threaded portion of the second axle member are moved along the threads of the female threaded portion of the first axle member or vice versa, for example to increase the overall length of the axle assembly including the first axle member and the second axle member, the friction enhancing member received in the indentation moves or is forced at least partially up the taper of the indentation, thereby increasing friction between the first axle member and the second axle member.

This increase in friction between the first axle member and the second axle member may facilitate the de-installation of the axle assembly. For example, it may facilitate loosening a connection between the first axle member and a fork or dropout arm when applying a torque on the second axle member engaged with the first axle member and the torque limiting mechanism. The increase in friction provided by the taper and the friction enhancing member allows unfastening or unscrewing both the first axle member and the second axle member in one piece. By contrast, without the increase in friction provided by the taper and friction enhancing member, a torque applied to the second axle member may simply result in a rotation of the second axle member relative to the first axle member without unfastening the connection between the first axle member and the fork or dropout arm.

The friction enhancing member may comprise an elastic material. For example, the friction enhancing member may be configured to be at least partially compressed between the first axle member and the second axle member as the friction enhancing member moves up the taper. For instance, the friction enhancing member may comprise or may be made of a thermoplastic material such as nylon, a thermoplastic elastomer (TPE), polyamide (PA) or polypropylene (PP). The friction enhancing member may comprise or may be configured as an annular member such as a circlip-shaped annular member or a spring-lock washer shaped annular member. However, it is understood that the friction enhancing member may have other shapes.

The first axle member may have a first end and a second end opposite the first end, and the recess of the first axle member may be open at least at the second end of the first axle member so that the recess is configured to receive the male threaded portion formed on the outer surface of the insertion portion of the second axle member at least at the second end of the first axle member. The first axle member may further comprise a first male threaded portion formed on an outer surface of the first axle member at the first end or in a first end section of the first axle member. Said first male threaded portion of the first axle member is then preferably configured to be received in a female threaded portion of a bicycle fork or of a bicycle dropout for forming a threaded connection between the first axle member and the bicycle fork or bicycle dropout.

The recess of the first axle member or formed in the first axle member may extend all the way from the first end to the second end of the first axle member so that the recess of the first axle member is open at both the first end and at the second end of the first axle member. In other words, the first axle member may be configured as a tubular member, wherein the female threaded portion of the first axle member is formed on an inner surface of the tubular member. The recess of the first axle member or formed in the first axle member is then preferably configured to receive the male threaded portion of the second axle member both at the first end and at the second end of the first axle member. Or in other words, the male threaded portion formed on the outer surface of the insertion portion of the second axle member may then be inserted into the recess of the first axle member or formed in the first axle member both at the first end and at the second end of the first axle member.

Additionally, the first axle member may comprise a second male threaded portion formed on an outer surface of the first axle member at the second end or in a second end section of the first axle member. Said second male threaded portion of the first axle member is preferably likewise configured to be received in a female threaded portion of a bicycle fork or of a bicycle dropout for forming a threaded connection between the first axle member and the bicycle fork or bicycle dropout. If the first axle member comprises said first and second male threaded portions formed on the outer surface of the first axle member at opposing ends or in opposing end sections of the first axle member, a first pitch of the first male threaded portion of the first axle member is preferably different from a second pitch of the second male threaded portion of the first axle member.

When the insertion portion of the second axle member may be inserted into the recess of the first axle member from both sides and when the first axle member has two male threaded portions with a different pitch size formed on both opposing ends, the axle assembly may be used with an even larger number of forks or dropouts as both male threaded portions of the first axle assembly may be used to form a connection with a mating thread of a fork or dropout.

The second axle member may comprise a first end portion including the insertion portion and a second end portion opposite the first end portion of the second axle member. The second end portion of the second axle member may comprise a structure such as a female socket for engagement with a tool such as an Allen® or hex key.

Alternatively, the axle assembly may comprise a fastening member, preferably for fastening the second axle member to a bicycle fork or to a bicycle dropout. The second axle member may then comprises a first end portion including the insertion portion and a second end portion opposite the first end portion of the second axle member. The fastening member may be configured to be coupled to the second end portion of the second axle member. The fastening member may comprise a structure such as a female socket for engagement with a tool, in particular for engagement with an Allen® or hex key.

Furthermore an axle and hub arrangement for a bicycle is proposed, comprising:
    the above-described axle assembly comprising at least the features noted in the claims; and
    a bicycle hub supported on or configured to be supported on the axle assembly.

In particular, the axle assembly and the bicycle hub may be configured such that when the male threaded portion of the second axle member is engaged with the female threaded portion of the first axle member, the bicycle hub may be simultaneously supported on the outer contour of the first support portion of the first axle member and on the outer contour of the second support portion of the second axle member.

The axle and hub arrangement may further comprise one of a bicycle fork and a bicycle dropout, the bicycle fork or the bicycle dropout having a first fork arm comprising a first recess and a second fork arm comprising a second recess. The fork, the axle assembly and the bicycle hub may then be configured such that when the male threaded portion of the second axle member is engaged with the female threaded portion of the first axle member, the first axle member is received or configured to be received in the first recess of the first fork arm, the second axle member is received or configured to be received in the second recess of the second fork arm. The bicycle hub may then be supported or configured to be supported on the outer contour of the first support portion of the first axle member and on the outer contour of the second support portion of the second axle member. This typically requires that the fork or dropout, the first axle member and the second axle member are configured such that in an assembled state of the axle and hub arrangement both the first support portion of the first axle member and the second support portion of the second axle member are at least partially disposed in between the first fork arm and the second fork arm along an axial direction defined by an axis of rotation of the arrangement.

Figure 4A:
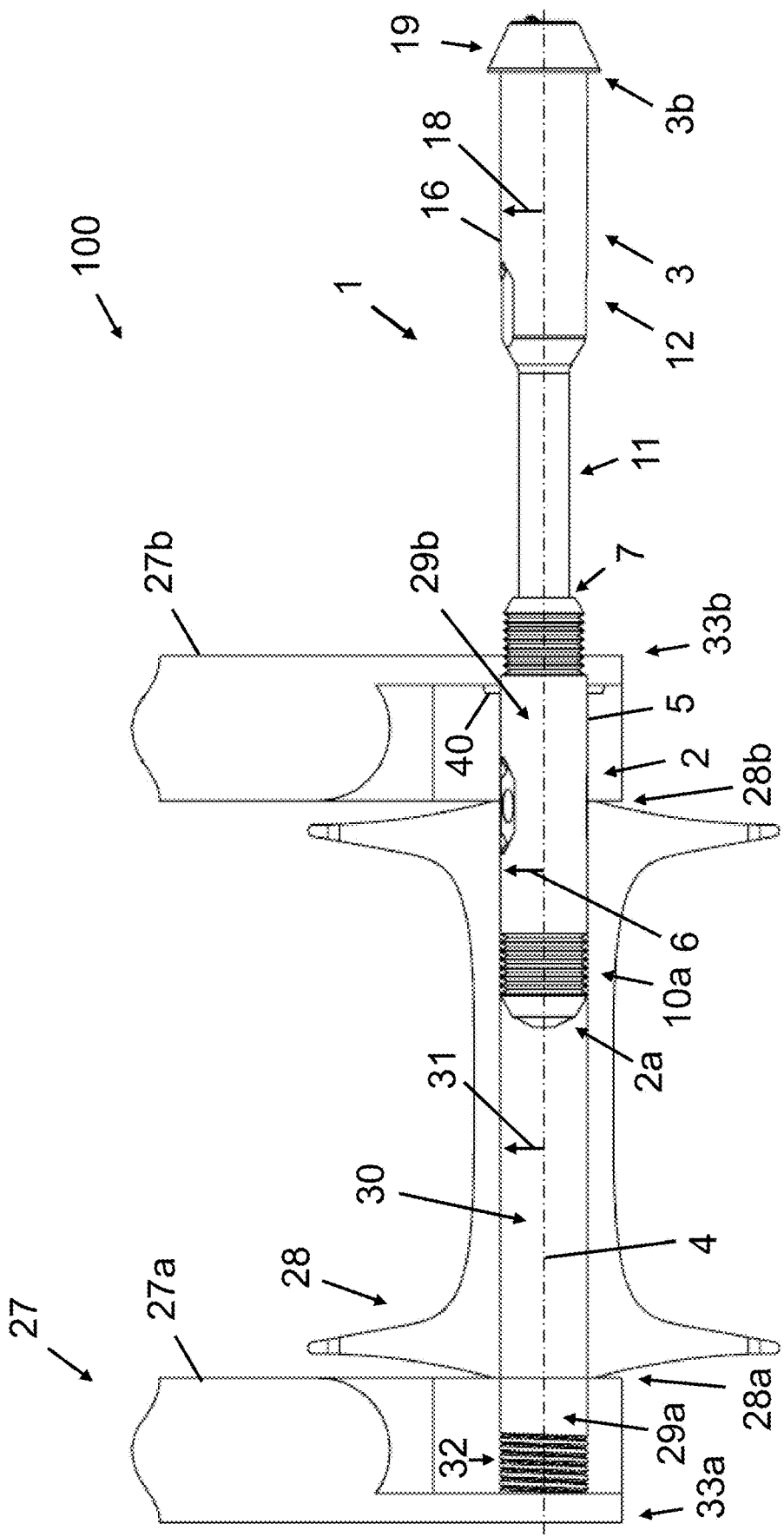
Figure 4B:
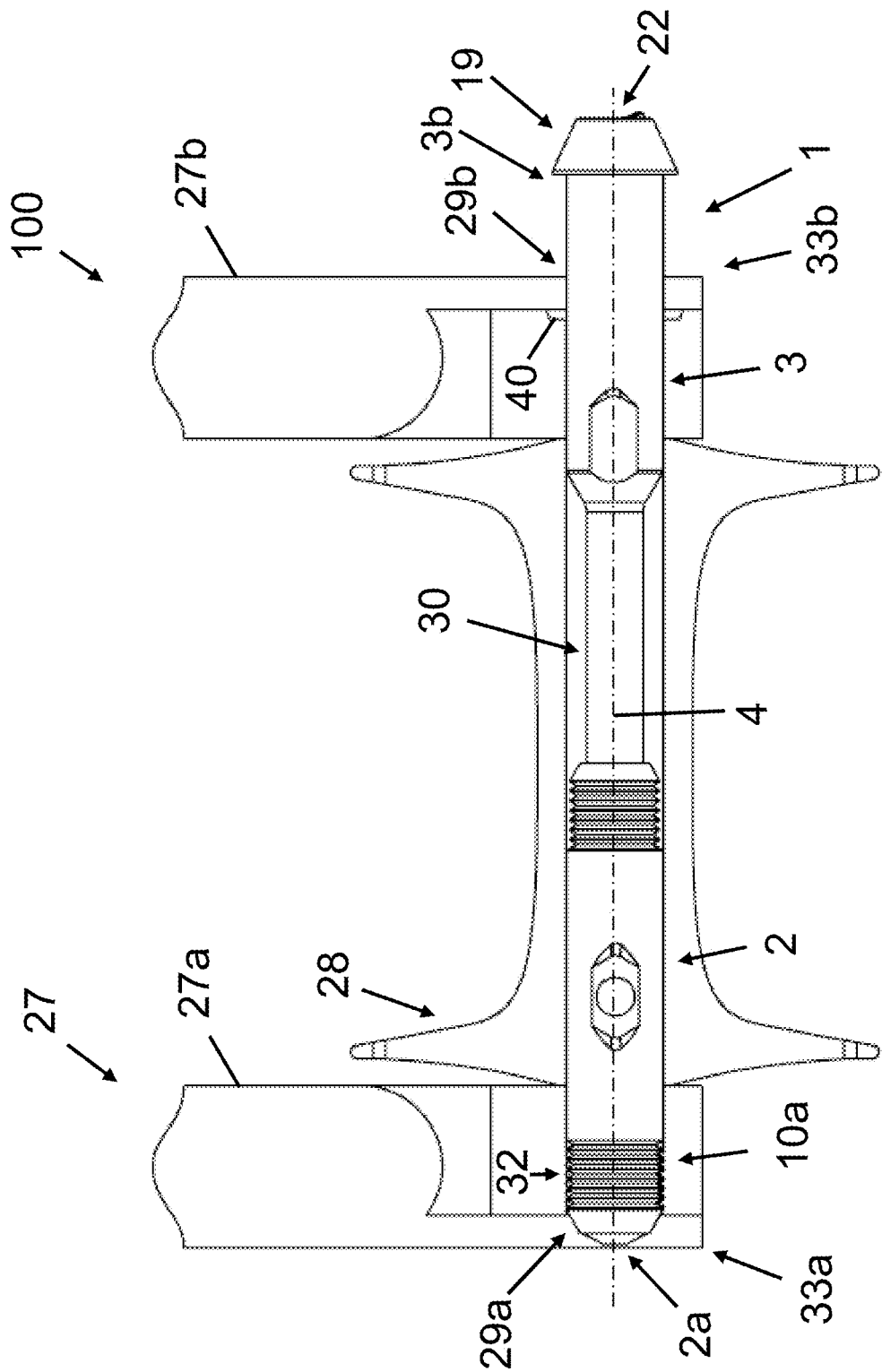
Figure 4C:
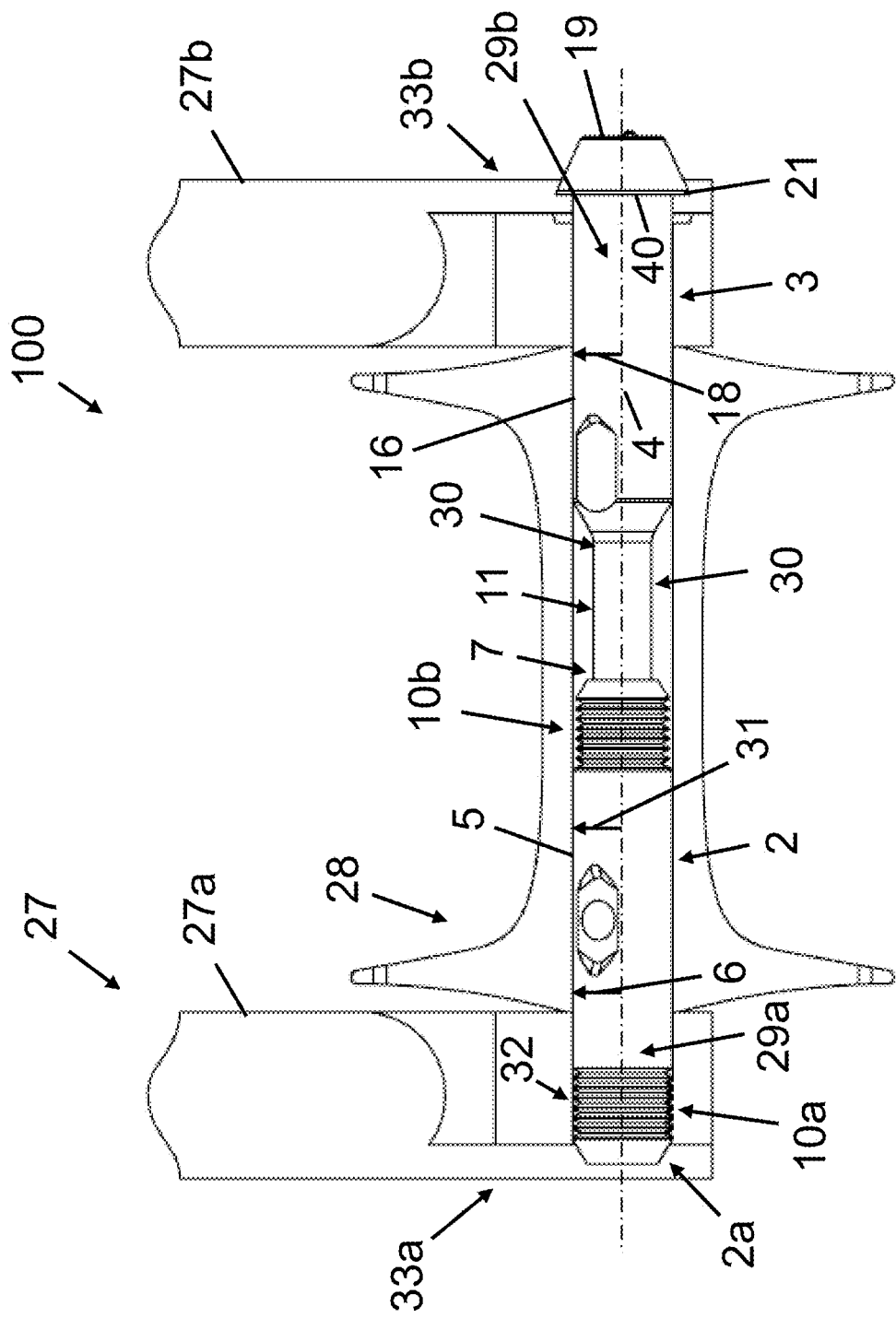
Figure 5:
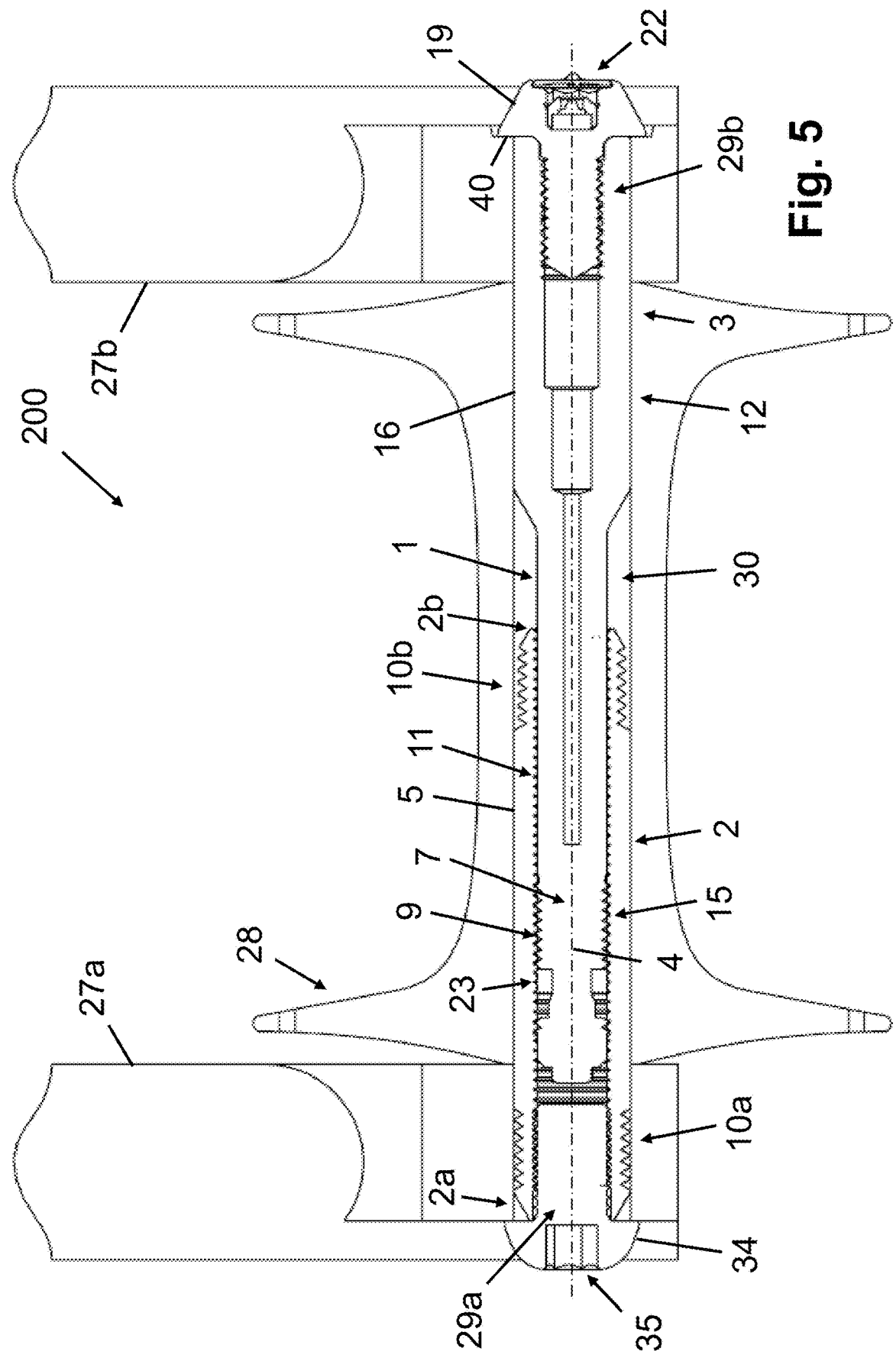
Figure 6A:
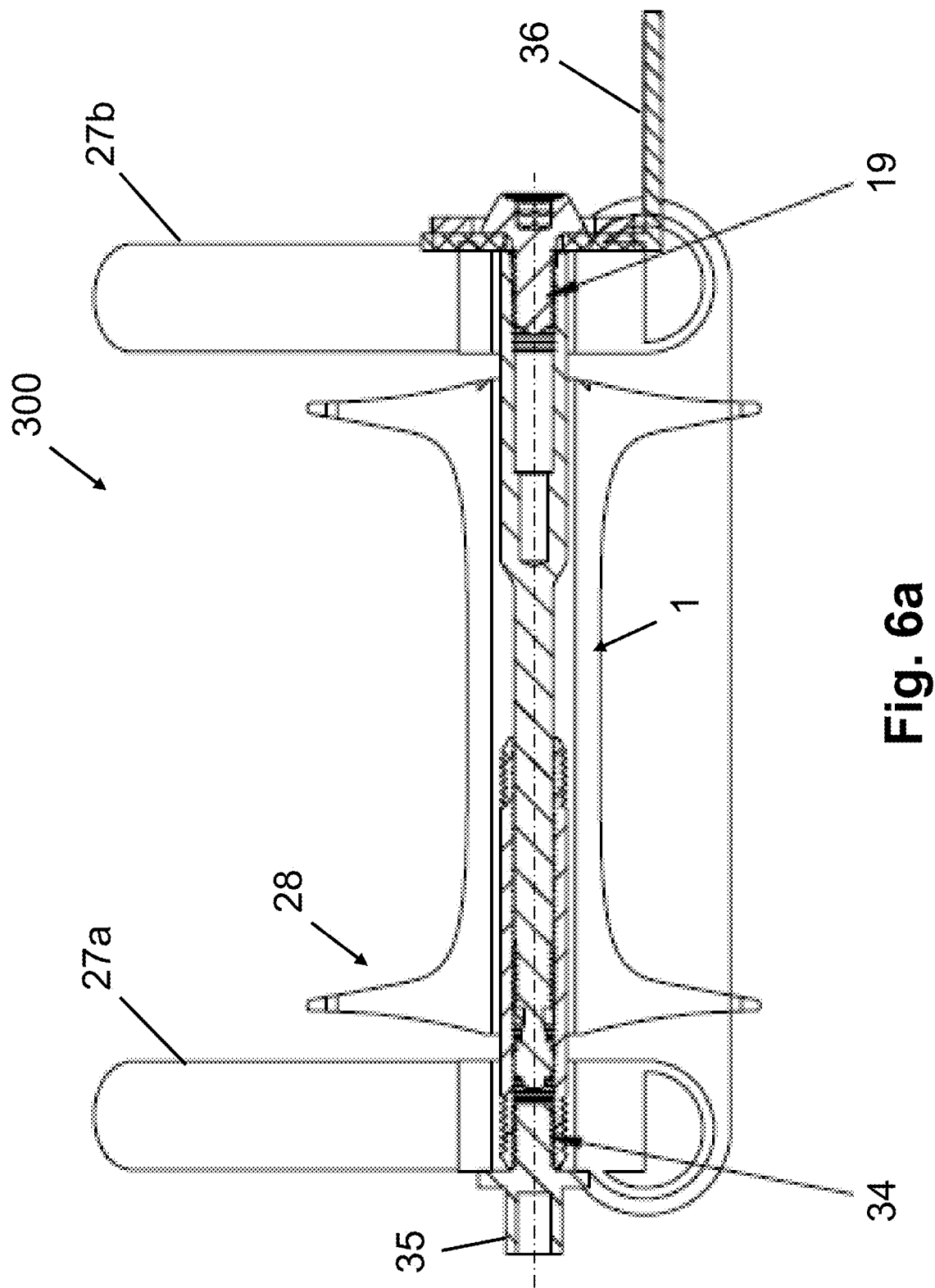

Special embodiments of the presently proposed axle assembly and axle and hub arrangement are described in the following detailed description and are depicted in the Figures, in which:

FIG. 1a schematically shows a side view of an embodiment of an axle assembly, wherein the axle assembly has an extended length;

FIG. 1b schematically shows a sectional view of the axle assembly of FIG. 1a;

FIG. 1c shows a detail of FIG. 1b;

FIG. 2a schematically shows the axle assembly of FIG. 1a, wherein the axle assembly has a shortened length;

FIG. 2b schematically shows a sectional view of the axle assembly of FIG. 2a;

FIG. 3a schematically shows a perspective view of the axle assembly of FIGS. 1 and 2;

FIG. 3b schematically shows a perspective exploded view of the axle assembly of FIG. 3a;

FIG. 4a schematically shows a first embodiment of an axle and hub arrangement comprising a bicycle fork, a bicycle hub and the axle assembly of FIGS. 1-3 at a first stage of an assembly process;

FIG. 4b schematically shows the axle and hub arrangement of FIG. 4a during a second stage of the assembly process;

FIG. 4c schematically shows the axle and hub arrangement of FIGS. 4a and 4b in an assembled state;

FIG. 5 schematically shows a sectional view of a second embodiment of an axle and hub arrangement;

FIG. 6a schematically shows a sectional view of a third embodiment of an axle and hub arrangement; and FIG. 6b schematically shows a perspective view of the axle and hub arrangement of FIG. 6a.

FIG. 1a schematically depicts a side view of an embodiment of an axle assembly or thru axle assembly 1 of the presently proposed type, wherein the thru axle assembly 1 has an extended length. FIG. 1b schematically depicts a section A-A of the extended axle assembly 1 depicted in FIG. 1a. FIG. 1c depicts a detail of FIG. 1b. FIG. 2a schematically depicts a side view of the axle assembly 1 of FIG. 1a, wherein the axle assembly 1 has a shortened length. And FIG. 2b schematically depicts a section A-A of the shortened axle assembly 1 depicted in FIG. 2a. In all of the following, recurring features shown in different Figures are designated with the same reference signs.

The axle assembly 1 is configured to be mounted on a bicycle fork or on a bicycle dropout and to support a bicycle hub and/or a bicycle wheel. The axle assembly 1 defines and extends along an axis of rotation 4. When a bicycle hub or a bicycle wheel is mounted on the axle assembly 1, the bicycle hub or bicycle wheel may rotate with respect to the axis of rotation 4 defined by the axle assembly 1.

The axle assembly 1 comprises a first axle member 2 and a second axle member 3. The first axle member 2 is an elongate member, in particular an elongate tubular member extending along the axis of rotation 4 and has a first end 2a and a second end 2b. The first axle member 2 may comprise or may be made of metal, metal alloys, polymers or carbon fiber, for example. For instance the first axle member 2 may comprise or may be made of at least one of titanium, steel, or aluminium. However, it is understood that the first axle member may comprise or may be made of other materials. In the embodiment shown in FIGS. 1 and 2 an axial length of the first axle member 2 determined along the axis of rotation 4 is approximately 65 mm. However, it is understood that the first axle member 2 may have other lengths.

The first axle member 2 comprises a first support portion 5 having a cylindrical outer contour or outer surface. The first support portion 5 of the first axle member 2 is configured to support or to at least partially support a bicycle wheel or a bicycle hub when the bicycle wheel or the bicycle hub is mounted on the axle assembly 1. It is understood that in alternative embodiments not explicitly depicted here the outer contour of the first support portion 5 may have other shapes that are suited to support a bicycle hub or a bicycle hub support member, in particular a bicycle hub or a bicycle hub support member having a cylindrical inner surface, in such a way that when the bicycle hub is mounted or at least partially mounted on the first support portion 5, an axis of rotation of the bicycle hub coincides with the axis of rotation 4 of the axle assembly 1. For example, in other embodiments a section of the first support portion 5 in a plane perpendicular to the axis of rotation 4 may have a polygonal shape, preferably a symmetric polygonal shape. For example it may have the shape of a regular hexagon, of a regular octagon, or the like.

A radius or maximum radial extension 6 of the outer contour of the first support portion 5 with respect to the axis of rotation 4 may have a length of 6 mm, of 7 mm or of 7.5 mm, for example. Generally, the axial length of the first support portion 5 may be at least three times or at least four times the length of the radius or of the maximum radial extension 6 of the first support portion 5. In the embodiment of FIGS. 1 and 2 the first support portion 5 has an axial extension of approximately 40 mm. However, it is understood that the first support portion 5 may have a different axial extension. Generally, the axial extension of the first support portion 5 of the first axle member 2 is at least 50 percent or at least 60 percent of the axial length of the first axle member 2.

The first axle member 2 comprises a cylindrical recess 7 formed in the first axle member 2. The recess 7 extends all the way through the first axle member 2 along the axial direction defined by the axis of rotation 4. The cylindrical recess 7 extends from the first end 2a to the second end 2b and is open at the first end 2a and at the second end 2b. In alternative embodiments not explicitly depicted here, the cylindrical recess 7 may only partially extend through the first axle member 2 along the axial direction and may be open only at the second end 2b of the first axle member 2. An inner surface or inner wall 8 of the first axle member 2 enclosing the recess 7 has a female threaded portion 9 formed thereon. In the embodiment shown in FIGS. 1b and 2b the female threaded portion 9 extends over the entire length of the recess 7 along the axial direction. However, it is understood that in alternative embodiments not explicitly depicted here, the female threaded portion 9 may extend over less than the entire length of the recess.

The second axle member 3 is an elongate member, in particular an elongate tubular member extending along the axis of rotation 4 and has a first end 3a and a second end 3b. The second axle member 3 may comprise or may be made of metal, metal alloys, polymers or carbon fiber, for example. For instance the second axle member 3 may comprise or may be made of at least one of titanium, steel, or aluminium. However, it is understood that the first axle member may comprise or may be made of other materials. In the embodiment shown in FIGS. 1 and 2 an axial length of the second axle member 3 determined along the axis of rotation 4 is approximately 115 mm. However, it is understood that the second axle member 3 may have other lengths.

The second axle member 3 comprises an insertion portion 11 and a protrusion portion 12. In the embodiment shown in FIGS. 1 and 2 the insertion portion 11 and the protrusion portion 12 are formed in one piece. However, it is conceivable that in alternative embodiments not explicitly depicted here the insertion portion 11 and the protrusion portion 12 are configured as separate components that are coupled to one another, for example by soldering, welding or by means of a mechanical connection. The insertion portion 11 extends from the first end 3a of the second axle member 3 to a conical transition portion 17 formed between the insertion portion 11 and the protrusion portion 12, and the protrusion portion 12 extends from the conical transition portion 17 to the second end 3b of the second axle member 3.

The insertion portion 11 of the second axle member 3 is an elongate cylindrical or tubular portion configured to be completely or at least partially inserted into or to be completely or at least partially received in the cylindrical recess 7 formed in the first axle member 2. In particular, a length of an outer radius 13 of the insertion portion 11 of the second axle member 3 is essentially equal to or just slightly smaller than an inner radius 14 of the cylindrical recess 7. The insertion portion 11 of the second axle member 3 has a male threaded portion 15 formed on an outer surface thereof. The male threaded portion 15 is formed in an end section of the insertion portion 11 at or near the first end 3a of the second axle member 3. The male threaded portion 15 of the second axle member 3 is configured to be engaged with or to mate with the female threaded portion 9 of the first axle member 2 to form a threaded connection between the first axle member 2 and the second axle member 3. In the embodiment depicted in FIGS. 1 and 2 an axial length of the insertion portion 11 is at least 80 percent or at least 90 percent of the axial length of the first axle member 2. However, it is understood that in alternative embodiments not explicitly depicted here the insertion portion 11 may have a smaller or shorter axial length. The male threaded portion 15 formed on the outer surface of the insertion portion 11 may extend over at least 10 percent or over at least 20 percent of the axial length of the insertion portion 11.

The insertion portion 11 of the second axle member 3 may be selectively either one of completely or at least partially advanced into and completely or at least partially retracted from the recess 7 of the first axle member 2 by moving the threads of the male threaded portion 15 of the second axle member 3 along the threads of the female threaded portion 9 of the first axle member 2, or vice versa. As the insertion portion 11 of the second axle member 3 is completely or at least partially received in the recess 7, the protrusion portion 12 of the second axle member 3 protrudes out of the recess 7. In FIGS. 1 and 2 the protrusion portion 12 protrudes out of the recess 7 at the second end 2b of the first axle member 2. In this manner, an overall axial length of the axle assembly 1 extending from the first end 2a of the first axle member 2 to the second end 3b of the second axle member 3 may be selectively either one of increased and decreased.

The axle assembly 1 depicted in FIGS. 1 and 2 is configured such that when the insertion portion 11 is retracted from or threaded out of the recess 7 to the extent that the male threaded portion 15 engages with or mates with the female threaded portion 9 over the entire axial length of the male threaded portion 15 and that further retracting the insertion portion 11 from or further threading the insertion portion 11 out of the recess 7 would result in the male threaded portion 15 engaging with or mating with the female threaded portion 9 over less than the entire axial length of the male threaded portion 15, the axle assembly 1 has a maximum axial length of approximately 155 mm. This situation is depicted in FIGS. 1a and 1b. On the other hand, when the insertion portion is fully inserted or fully threaded into the recess 7, the axle assembly 1 has a minimum axial length of approximately 120 mm. This situation is depicted in FIGS. 2a and 2b. Or in other words, starting from its maximum axial length depicted in FIGS. 1a and 1b, the axial length of the axle assembly 1 may be decreased down to about ¾ of its maximum axial length.

The protrusion portion 12 of second axle member 3 comprises a second support portion 16 having a cylindrical outer contour or outer surface. The second support portion 16 of the second axle member 3 is configured to support or to at least partially support a bicycle wheel or a bicycle hub when the bicycle wheel or the bicycle hub is mounted on the axle assembly 1. It is understood that in alternative embodiments not explicitly depicted here the outer contour of the second support portion 16 may have other shapes that are suited to support a bicycle hub or a bicycle hub support member, in particular a bicycle hub or a bicycle hub support member having a cylindrical inner surface, in such a way that when the bicycle hub is mounted or at least partially mounted on the second support portion 16, an axis of rotation of the bicycle hub coincides with the axis of rotation 4 of the axle assembly 1. For example, in other embodiments a section of the second support portion 16 in a plane perpendicular to the axis of rotation 4 may have a polygonal shape, preferably a symmetric polygonal shape. For example it may have the shape of a regular hexagon, of a regular octagon, or the like.

A radius or maximum radial extension 18 of the outer contour of the second support portion 16 of the second axle member 3 with respect to the axis of rotation 4 is identical to the radius or to the maximum radial extension 6 of the outer contour of the first support portion 5 of the first axle member 2. This allows supporting a bicycle hub or a bicycle hub support member on the outer contour of the first support portion 5 and on the outer contour of the second support portion 16 at the same time. In this way, a load on the axle assembly 1 may be equally distributed over the first axle member 2 and the second axle member 3, for example.

In the embodiment shown in FIGS. 1 and 2 the radius or maximum radial extension 18 of the second support portion 16, like the radius or maximum radial extension 6 of the first support portion 5, may have a length of 6 mm, of 7 mm or of 7.5 mm, for example. Generally, an axial length of the second support portion 16 may be at least three times or at least four times the length of the radius or maximum radial extension 18 of the second support portion 16. In the embodiment of FIGS. 1 and 2 the second support portion 16 has an axial extension of approximately 40 mm. However, it is understood that the second support portion 16 may have a different axial extension. Generally, the axial extension of the second support portion 16 of the second axle member 3 is at least 20 percent or at least 30 percent of the axial length of the second axle member 3.

The first axle member 2 further has a first male threaded portion 10a having a first pitch formed on its outer surface. For example, the first male threaded portion 10a may have a pitch of 1.0 mm, of 1.5 mm or of 1.75 mm. However, it is understood the pitch of the first male threaded portion 10a may have other values. The first male threaded portion 10a is disposed in a first end section of the first axle member 2 at or near the first end 2a of the first axle member 2. The first male threaded portion 10a of the first axle member 2 is configured to be engaged with a mating female threaded portion of a bicycle fork or of a bicycle dropout having the same first pitch, for forming a threaded connection between the first axle member 2 and the bicycle fork or bicycle dropout.

And the first axle member 2 has a second male threaded portion 10b having a second pitch formed on its outer surface, wherein the second pitch of the second male threaded portion 10b is different from the first pitch of the first male threaded portion 10a. For example, the second male threaded portion 10b may have a pitch of 1.0 mm, of 1.5 mm or of 1.75 mm. However, it is understood the pitch of the second male threaded portion 10b may have other values. The second male threaded portion 10b is disposed in a second end section of the first axle member 2 at or near the second end 2b of the first axle member 2. The second male threaded portion 10b of the first axle member 2 is configured to be engaged with a mating female threaded portion of a bicycle fork or of a bicycle dropout having the same second pitch, for forming a threaded connection between the first axle member 2 and the bicycle fork or bicycle dropout.

The fact that the first axle member 2 has two male threaded portions 10a, 10b having different pitches and being formed in end sections near or at its opposing ends 2a, 2b allows the first axle member 2 to be engaged with corresponding female threaded portions of a bicycle fork or of a bicycle dropout of at least two different sizes. Since the recess 7 formed in the first axle member 2 extends over the entire axial length of the first axle member 2 and is open at both axial ends 2a, 2b of the first axle member 2, the insertion portion 11 of the second axle member 3 may be inserted into the recess 7 of the first axle member 2 at or from both ends 2a, 2b of the first axle member 2. For example, if the insertion portion 11 is inserted into the recess 7 at or from the second end 2b of the first axle member 2, as shown in FIGS. 1 and 2, the first axle member 2 may be mounted on or connected to a bicycle fork or bicycle dropout with its first end 2a or with its first male threaded portion 10a. By contract, if the insertion portion 11 is inserted into the recess 7 at or from the first end 2a of the first axle member 2 (not shown), the first axle member 2 may be mounted on or connected to a bicycle fork or bicycle dropout with its second end 2b or with its second male threaded portion 10b. This way, the axle assembly 1 may be used with an advantageously large number of bicycle forks or bicycle dropouts.

In the embodiment shown in FIGS. 1 and 2 the axle assembly 1 further comprises a fastening member 19 coupled or connected to or configured to be coupled or connected to the second axle member 3 at the second end 3b thereof. In FIGS. 1 and 2 the fastening member 19 is configured as a screw. However, it is understood that in alternative embodiments not explicitly depicted here the axle assembly 1 may comprise different types of fastening members, such as a fastening member including a quick release mechanism or the like. In FIGS. 1 and 2, the fastening member 19 is configured to be received in a recess 20 formed in the second axle member 3 and open at the second end 3b of the second axle member 3. In FIGS. 1 and 2 the fastening member 19 may be coupled to the second axle member 3 via a threaded connection. A maximum radial extension portion 21 of the fastening member 19 is larger than the radius or maximum radial extension 18 of the second axle member 3 so that the fastening member 19 may be used to mount a bicycle hub supported on the axle assembly 1 on a bicycle fork or bicycle dropout by compressing the bicycle hub between the two arms of the fork or of the dropout (see FIGS. 4c and 5).

The fastening member 19 has a structure 22 such as a female socket formed at an end thereof. The structure 22 is configured to engage with a tool such as with an Allen® or hex key. In this manner, the tool may be used to further advance the fastening member 19 inside the recess 20 or to retract the fastening member 19 from the recess 20. Also, the tool may be used to further advance the insertion portion 11 inside the recess 7 of the first axle member 2 or to retract the insertion portion 11 from the recess 7 of the first axle member 2, for example. It is understood that in alternative embodiments features equivalent to the portion 21 and the structure 22 may be formed in one piece with the second axle member 3. In other words, in alternative embodiments an end portion of the second axle member 3 comprising the second end 3b of the second axle member 3 may include a structure such as a female socket for engagement with a tool such as with an Allen® or hex key.

The axle assembly 1 further includes a torque limiting mechanism 23 configured to selectively rotationally lock the first axle member 2 and the second axle member 3 to one another and to limit a torque transmitted between the first axle member 2 and the second axle member 3 when the male threaded portion 15 of the second axle member 3 is engaged with the female threaded portion 9 of the first axle member 9, as shown in FIGS. 1b and 2b, for example. A more detailed view of the torque limiting mechanism 23 is shown in FIG. 1c which depicts a detail of the sectional view of FIG. 1b.

Turning to FIG. 1c, the torque limiting mechanism 23 includes a friction enhancing member 24 mounted on the insertion portion 11 of the second axle member 3. In FIGS. 1 and 2 the friction enhancing member 24 has an annular shape, for example a ring-like shape, a circlip-shape or a spring-lock washer shape. Here, the friction enhancing member 24 is made of an elastic and at least partially compressible material such as nylon. However, it is understood that the friction enhancing member 24 may comprise or may be made of other elastic materials, preferably other thermoplastic materials such as thermoplastic elastomers (TPE), polyamide (PA), polypropylene (PP) or the like.

The annular-shaped friction enhancing member 24 is received in a correspondingly shaped annular indentation 25 formed in or on the outer surface of the insertion portion 11 of the second axle member 3. A thickness of the friction enhancing member 24 and a depth of the annular indentation 25, both determined in a direction perpendicular to the axis of rotation 4, are chosen such that when the threads of the male threaded portion 15 on the outer surface of the insertion portion 11 are engaged with the mating threads of the female threaded portion 9 on the inner surface 8 of the first axle member 2 enclosing the recess 7, the elastic or at least partially elastic friction enhancing member 24 is at least partially compressed between the first axle member 2 and the second axle member 3 and frictionally interferes with the female threaded portion 9 of the first axle member 2.

In other words, the indentation 25 and the friction enhancing member 24 are configured such that torque may be transmitted between the first axle member 2 and the second axle member 3 only up to a maximum relative torque or threshold torque which is determined by the static friction between the axle members 2 and 3 provided by the friction enhancing member 24. If a relative torque between the axle members 2 and 3 exceeds said maximum relative torque or threshold torque, the axle members 2 and 3 start rotating relative to one another and the threads of the male threaded portion 15 move along the mating threads of the female threaded portion 9, or vice versa. The value of the above-described threshold torque depends on factors such as frictional properties of the friction enhancing member 24 and of the female threaded portion 9, and on the size of a contact surface between the friction enhancing member 24 and the female threaded portion 9, for example.

In the embodiment depicted in FIGS. 1 and 2 the indentation 25 in which the friction enhancing member 24 is received includes a tapered portion 26 where the outer surface of the insertion portion 11 tapers along the axial direction defined by the axis of rotation 4. Or in other words, in the tapered portion 26 of the indentation 25 an outer radius or a radial extension of the insertion portion 11 increases or decreases along the radial direction 4. For example, the tapered portion 26 may include a conical portion. In the embodiment depicted in FIGS. 1 and 2 the tapered portion 26 is configured such that as the second axle member 3 is moved in a first direction 4a relative to the first axle member 2 (to the left in FIG. 1c), the friction enhancing member 24 is forced to move at least partially up the taper where the indentation 25 has a decreased depth, resulting in increased compression of the friction enhancing member 24 between the axle members 2 and 3 and in increased friction between the axle members 2 and 3. In other words, due to the tapered portion 26 of the indentation 25 the maximum torque that may be transmitted between the axle members 2 and 3 is higher when the second axle member 3 is moved in the first direction 4a relative to the first axle member 2 than it is when the second axle member 3 is moved in a second direction 4b relative to the first axle member 2, wherein the second direction 4b is opposite to the first direction 4a.

The advantageous effect of the torque limiting mechanism 23 and of the unisotropic static friction between the axle members 2 and 3 with respect to relative movement of the axle members 2 and 3 in the first direction 4a and in the second direction 4b do to the design of the tapered portion 26 will be explained in some more detail further below.

FIG. 3a schematically shows a perspective view of the axle assembly 1 of FIGS. 1 and 2, and FIG. 3b schematically shows the axle assembly 1 of FIG. 3a in an exploded view. Only for simplicity the friction enhancing member 24 is depicted as being arranged at a distance from the first end 3a of the second axle member 3 in FIG. 3b. It is understood that in the assembled state of the axle assembly 1 the friction enhancing member 24 is received in the indentation 25 on the outer surface of the insertion portion 11, as explained above with respect to FIGS. 1 and 2.

FIGS. 4a-c schematically show an axle and hub arrangement 100 for a bicycle according to a first embodiment. FIG. 4a illustrates the arrangement 100 at a first stage of assembly; FIG. 4b illustrates the arrangement 100 at a second stage of assembly; and FIG. 4c depicts the arrangement 100 in a fully assembled state. The axle and hub arrangement 100 comprises the axle assembly 1 of FIGS. 1-3, a bicycle fork 27 comprising a first fork arm 27a and a second fork arm 27b, and a bicycle hub 28 disposed in between the first fork arm 27a and the second fork arm 27b of the bicycle fork 27. In FIG. 4a the fork arms 27a, 27b contact the hub 28 at opposing axial ends 28a, 28b of the hub 28, respectively.

The bicycle hub 28 comprises a cylindrical recess 30. The recess 30 extends all the way through the bicycle hub 28 along the axis of rotation 4 and is configured to receive the axle assembly 1 therein. Specifically, a radius 31 of the cylindrical recess 30 of the hub 28 is just slightly larger than the radius or maximum radial extension 6 of the first support portion 5 of the first axle member 2, and than the radius or maximum radial extension 18 of the second support portion 16 of the second axle member 3.

A first recess 29a formed in the first fork arm 27a is configured to receive the first axle member 2 of the axle assembly 1. In the arrangement 100 depicted in FIGS. 4a-c the first recess 29a has a female threaded portion 32 formed on an inner surface thereof. The female threaded portion 32 formed in the first recess 29a is configured to engage with the first male threaded portion 10a formed on the outer surface of the first axle member 2 of the axle assembly 1. And a second recess 29b formed in the second fork arm 27b is configured to receive the second axle member 3 of the axle assembly 1. The second fork arm 27b further comprises a seat portion 40 for receiving the portion 21 of the fastening member 19 (see FIG. 4c).

At the first assembly stage depicted in FIG. 4a the insertion portion 11 of the second axle member 3 is only partially inserted into the recess 7 of the first axle member 2. The axle assembly 1 has a first axial length extending from the first end 2a of the first axle member 2 to the second end 3b of the second axle member 3. The first axial length of the axle assembly 1 as shown in FIG. 4a is larger than an axial length of the fork 27 extending between opposing axial ends 33a, 33b of the fork 27. Further in FIG. 4a, the hub 28 and the axle assembly 1 are aligned with the axis of rotation 4 defined by the recesses 29a, 29b of the fork arms 27a, 27b, and the axle assembly 1 reaches through the second recess 29b of the second fork arm 27b and is partially inserted into the recess 30 of the hub 28.

At the second assembly stage depicted in FIG. 4b the axle assembly 1 reaches all the way through the recess 30 of the hub 28 and through the recesses 29a, 29b of the fork arms 27a, 27b. Specifically, a first end section of the first axle member 2 is fully received in the first recess 29a of the first fork arm 27a and the first male threaded portion 10a of the first axle member 2 is fully threaded into the female threaded portion 32 of the first fork arm 27a, forming a threaded connection between the first fork arm 27a and the first axle member 2. For example, the first axle member 2 may have been threaded into the female threaded portion 32 of the first fork arm 27a by means of a tool such as an Allen® or hex key through engagement of the tool with the structure 22 formed in the fastening member 19.

Notably, even after the first axle member 2 has been fully threaded into the first fork arm 27a, as shown in FIG. 4b, the axle assembly 1 still has the same first axial length as in FIG. 4a. That is, the torque limiting mechanism 23 depicted in FIG. 1c and explained above is configured such that it allows threading the axle assembly 1 comprising the first axle member 2 and the second axle member 3 into the female thread 32 of the first fork arm 27a as one piece. Or in other words, the friction between the axle members 2 and 3 created by the friction enhancing member 24 of the torque limiting mechanism prevents the axle members 2 and 3 from rotating relative to one another as the first axle member 2 is threaded into the female threaded portion 32 of the first fork arm 27a, thereby greatly facilitating the assembly process.

Furthermore, the torque limiting mechanism 23 depicted in FIG. 1c is configured such that the relative torque between the axle members 2 and 3 that has to be exceeded in order for the axle members 2 and 3 to rotate relative to one another is higher when the insertion portion 11 of the second axle member 3 is retracted from the recess 7 (that is when the second axle member 2 is moved to the right relative to the first axle member 2 in FIGS. 4a-c) than it is when the insertion portion 11 is further advanced into the recess 7 (that is when the second axle member 2 is moved to the right relative to the first axle member 2 in FIGS. 4a-c). Specifically, the torque limiting mechanism 23 may be configured such that in order to disassemble the arrangement 100 the threaded connection between the first axle member 2 and the first fork arm 27a may be loosened by applying a loosening torque to the second axle member 3, for example by means of a tool engaged with the structure 22 of the fastening member 19, without this loosening torque causing an unwanted relative rotation between the axle members 2 and 3 of the axle assembly 1. That is, the torque limiting mechanism 23 including the tapered portion 26 of the indentation 25 and the friction enhancing member 24 is configured such that just as the axle assembly 1 can be threaded into the threaded portion 32 of the first fork arm 27a as one piece (that is without unwanted relative rotation between the axle members 2 and 3), the axle assembly 1 can also be threaded out of the threaded portion 32 of the first fork arm 27a as one piece, for example by means of a tool engaged with the structure 22 of the fastening member 19.

In the fully assembled state depicted in FIG. 4c the insertion portion 11 of the second axle member 3 has been further advanced into the recess 7 formed in the first axle member 2. That is, in FIG. 4c the axle assembly 1 has a second axial length extending from the first end 2a of the first axle member 2 to the second end 3b of the second axle member 3, wherein the second axial length of the axle assembly 1 shown in FIG. 4c is smaller than the first axial length of the axle assembly 1 shown in FIGS. 4a and 4b. To shorten the axial length of the axle assembly 1 to the second length shown in FIG. 4c, the torque applied to the second axle member 3 relative to the first axle member 2 has to exceed the threshold torque of the torque limiting mechanism 23, as explained above with respect to FIG. 1c. In the fully assembled state shown in FIG. 1c the portion 21 of the fastening member 19 is received in the seat portion 40 of the second fork arm 27b and bears against the second fork arm 27b, thereby compressing the hub 28 in between the fork arms 27a, 27b along the axial direction 4 and tightly mounting the axle assembly 1 and the hub 28 on the bicycle fork 27.

In the fully assembled state of the arrangement 100 shown in FIG. 4c both the first support portion 5 of the first axle member 2 and the second support portion 16 of the second axle member 3 are at least partially disposed in between the fork arms 27a, 27b along the axial direction. Thus, in the fully assembled state shown in FIG. 4c the hub 28 is radially supported on the outer contour of the first support portion 5 of the first axle member 2 and on the outer contour of the second support portion 16 of the second axle member 3 so that the hub 28 may rotate with respect to the axis of rotation 4.

FIG. 5 schematically shows a sectional view an axle and hub arrangement 200 according to a second embodiment. As before, recurring features are designated with the same reference signs. In FIG. 5 the arrangement 200 is in a fully assembled state, similar to the arrangement 100 depicted in FIG. 4c. The arrangement 200 of FIG. 5 differs from the arrangement 100 of FIG. 4c only in that in the arrangement 200 of FIG. 5 the first recess 29a of the first fork arm 27a does not have a threaded portion formed on its inner surface which may mate with the first male threaded portion 10a formed on the outer surface of the first axle member 2. That is, in the arrangement 200 of FIG. 5 the first axle member 2 is not connected to the first fork arm 27a via a threaded connection. Instead, the arrangement 200 of FIG. 5 comprises a further fastening member 34 for connecting the first axle member 2 with the first fork arm 27a. In FIG. 5 the fastening member 34 is configured as a screw having a male threaded portion formed on its outer surface which is received in the recess 7 at the first end 2a of the first axle member 2 and which is engaged with the female threaded portion 9 formed on the inner surface of the first axle member 2 enclosing the recess 7. It is understood that in alternative embodiments not explicitly depicted here the fastening member 34 may comprise another coupling mechanism, for example a quick release mechanism. In FIG. 5 the fastening member 34 further has a structure 35 for engagement with a tool formed therein. In FIG. 5 the fastening members 19, 34 each bear against one the fork arms 27a, 27b in opposite directions along the axial direction defined by the axis of rotation 4.

FIG. 6a schematically shows a sectional view of an axle and hub arrangement 300 according to a third embodiment. In FIG. 6a the arrangement 300 is in a fully assembled state, similar to the arrangements 200 depicted in FIG. 5. The arrangement 300 of FIG. 6a differs from the arrangement 200 of FIG. 5 in that the arrangement 300 additionally has a first trailer attachment 35 coupled to the first fork arm 27a and a second trailer attachment 36 coupled to the second fork arm 27b. The first trailer attachment 35 is formed in one piece with the fastening member 34. And the second trailer attachment 36 is clamped in between the fastening member 19 and the second fork arm 27b. FIG. 6b schematically shows a perspective view of the arrangement 300 of FIG. 6a.

The invention claimed is:

1. Axle assembly for supporting a bicycle hub, the axle assembly having an adjustable length and comprising:
   a first axle member comprising a recess which is open at least at one end of the first axle member, and further comprising a female threaded portion formed on an inner surface of the first axle member enclosing the recess; and
   a second axle member comprising an insertion portion and a protrusion portion;
   wherein the insertion portion of the second axle member is at least partially received or configured to be at least partially received in the recess of the first axle member and has a male threaded portion formed on an outer surface of the insertion portion, the male threaded portion of the second axle member configured to be engaged with the female threaded portion of the first axle member; and
   wherein when the insertion portion of the second axle member is received or at least partially received in the recess of the first axle member and the male threaded portion of the second axle member is engaged with the female threaded portion of the first axle member, the protrusion portion of the second axle member protrudes out of the recess of the first axle member and an overall length of the axle assembly is adjustable by moving the threads of the male threaded portion of the second axle member along the threads of the female threaded portion of the first axle member, or vice versa,
   wherein the first axle member has a first end and a second end, wherein the recess of the first axle member is open at least at the second end of the first axle member so that the recess is configured to receive the male threaded portion of the second axle member at least at the second end of the first axle member, and wherein an outer surface of the first axle member at the first end of the first axle member comprises a first male threaded portion.

2. The axle assembly as claimed in claim 1, wherein the first axle member comprises a first support portion and wherein the protrusion portion of the second axle member comprises a second support portion; wherein when the male threaded portion of the second axle member is engaged with the female threaded portion of the first axle member, the first support portion and the second support portion are configured to support a bicycle hub or a bicycle hub support member on an outer contour of the first support portion and on an outer contour of the second support portion.

3. The axle assembly as claimed in claim 1, wherein the recess of the first axle member extends all the way from a first end of the first axle member to a second end of the first axle member so that the recess of the first axle member is open at both the first end and at the second end of the first axle member, wherein the recess of the first axle member is configured to receive the male threaded portion of the second axle member both at the first end and at the second end of the first axle member.

4. The axle assembly as claimed in claim 1, wherein the first axle member comprises a first support portion and wherein the protrusion portion of the second axle member comprises a second support portion; wherein when the male threaded portion of the second axle member is engaged with the female threaded portion of the first axle member, the first support portion and the second support portion are configured to support a bicycle hub or a bicycle hub support member on an outer contour of the first support portion and on an outer contour of the second support portion; and wherein the recess of the first axle member extends all the way from a first end of the first axle member to a second end of the first axle member so that the recess of the first axle member is open at both the first end and at the second end of the first axle member, wherein the recess of the first axle member is configured to receive the male threaded portion of the second axle member both at the first end and at the second end of the first axle member.

5. The axle assembly as claimed in claim 1, further comprising a torque limiting mechanism configured to selectively rotationally lock the first axle member and the second axle member to one another and to limit a torque transmitted between the first axle member and the second axle member when or only when the male threaded portion of the second axle member is engaged with the female threaded portion of the first axle member.

6. The axle assembly as claimed in claim 5, wherein the torque limiting mechanism comprises a friction enhancing member mounted on one of the first axle member and the second axle member, the friction enhancing member configured to selectively rotationally lock the first axle member and the second axle member to one another by selectively frictionally locking the first axle member and the second axle member to one another.

7. The axle assembly as claimed in claim 6, wherein the friction enhancing member is mounted on the first axle member and configured to frictionally interfere with the male threaded portion of the second axle member; and/or wherein the friction enhancing member is mounted on the second axle member and configured to frictionally interfere with the female threaded portion of the first axle member.

8. The axle assembly as claimed in claim 6, wherein one of
 a. the inner surface of the first axle member enclosing the recess of the first axle member, and
 b. the outer surface of the insertion portion of the second axle member comprises an indentation, wherein the friction enhancing member is received in or configured to be received in the indentation.

9. The axle assembly as claimed in claim 8, wherein when the male threaded portion of the second axle member is engaged with the female threaded portion of the first axle member, the first axle member and the second axle member define an axial direction, wherein the indentation comprises a taper along the axial direction, wherein the taper is configured such that when the threads of the male threaded portion of the second axle member are moved along the threads of the female threaded portion of the first axle member or vice versa to increase the overall length of the axle assembly, the friction enhancing member received in the indentation moves at least partially up the taper of the indentation, thereby increasing friction between the first axle member and the second axle member.

10. The axle assembly as claimed in claim 6, wherein the friction enhancing member comprises a thermoplastic material.

11. The axle assembly as claimed in claim 6, wherein the friction enhancing member comprises an annular member.

12. The axle assembly as claimed in claim 1, wherein the recess of the first axle member extends from the first end to the second end of the first axle member and is open at the first end and at the second end of the first axle member so that the recess is configured to receive the male threaded portion of the second axle member both at the first end and at the second end of the first axle member, and wherein an outer surface of the first axle member at the second end of the first axle member comprises a second male threaded portion, the second male threaded portion of the first axle member, wherein a first pitch of the first male threaded portion of the first axle member is different from a second pitch of the second male threaded portion of the first axle member.

13. The axle assembly as claimed in claim 1, wherein the second axle member comprises a first end portion comprising the insertion portion and a second end portion opposite the first end portion, wherein the second end portion of the second axle member comprises a structure such as a female socket for engagement with a tool.

14. The axle assembly as claimed in claim 1, further comprising a fastening member, wherein the second axle member comprises a first end portion including the insertion portion and a second end portion opposite the first end portion, wherein the fastening member is configured to be coupled to the second end portion of the second axle member, the fastening member comprising a structure for engagement with a tool.

15. An axle and hub arrangement for a bicycle, comprising:
 the axle assembly of claim 2;
 and a bicycle hub;
 wherein the axle assembly and the bicycle hub are configured such that when the male threaded portion of the second axle member is engaged with the female threaded portion of the first axle member, the bicycle hub is supported on or configured to be supported on the outer contour of the first support portion of the first axle member and on the outer contour of the second support portion of the second axle member.

16. The axle assembly as claimed in claim 15, further comprising one of a bicycle fork and a bicycle dropout, the bicycle fork or the bicycle dropout having a first fork arm comprising a first recess, and a second fork arm comprising a second recess;
 wherein when the male threaded portion of the second axle member is engaged with the female threaded portion of the first axle member, the first axle member is received or configured to be received in the first recess of the first fork arm, the second axle member is received or configured to be received in the second recess of the second fork arm, and the bicycle hub is supported or configured to be supported on the outer contour of the first support portion of the first axle member and on the outer contour of the second support portion of the second axle member.

* * * * *